RE. 25150

Nov. 26, 1957 R. ADLER 2,814,801

TELEVISION RECEIVER SYNC SEPARATOR AND NOISE-GATED AUTOMATIC GAIN CONTROL SYSTEM

Original Filed Aug. 18, 1951 2 Sheets-Sheet 1

ROBERT ADLER
*INVENTOR.*

BY Francis W. Crotty

HIS ATTORNEY.

ROBERT ADLER
*INVENTOR.*
BY Francis W. Crotty
HIS ATTORNEY.

United States Patent Office 2,814,801

Patented Nov. 26, 1957

2,814,801

TELEVISION RECEIVER SYNC SEPARATOR AND NOISE-GATED AUTOMATIC GAIN CONTROL SYSTEM

Robert Adler, Northfield, Ill., assignor to Zenith Radio Corporation, a corporation of Illinois Original application August 18, 1951, Serial No. 242,509, now Patent No. 2,717,972, dated September 13, 1955. Divided and this application October 11, 1952, Serial No. 314,373

8 Claims. (Cl. 178—7.5)

This invention relates to television receivers and more particularly to synchronizing and automatic gain control systems for use in such receivers. This application is a division of the copending application of Robert Adler, Serial No. 242,509, filed August 18, 1951, for Television Receiver, and assigned to the present assignee.

In accordance with present standards for the transmission of television images, the transmitted image is represented by a composite television signal including modulation components representing the video-signal information and other modulation components representing synchronizing-signal information for maintaining the scanning operation at the receiver in synchronism with that employed at the transmitter. In order to segregate the synchronizing information from the picture information, a synchronizing-signal separator is employed at the receiver in the form of an amplitude-selective device responsive only to the synchronizing-signal components of the demodulated composite video signals, which are of larger amplitude than the maximum amplitude of the video-signal components. The separated synchronizing-signal pulses are applied to the scanning system associated with the image-reproducing device to effect receiver synchronism. In some conventional receivers, the synchronizing-signal separator assumes the form of a peak clipper. In others, a pentagrid converter tube or a gated-beam tube serves as a synchronizing-signal slicer by virtue of the step-function type operating characteristic of a control grid which follows a virtual cathode. In any case, the synchronizing-signal separator is generally self-biased to provide for automatic adjustment of the clipping or slicing level with variations in signal strength.

It is also customary practice to employ automatic gain control for the receiver circuits to prevent overloading on strong signals while providing full gain under weak signal conditions. For this purpose, a unidirectional control potential is derived from the demodulated composite video signals and applied to one or more of the amplifying stages preceding the video detector. Since the video-signal components of the composite video signals vary in amplitude in accordance with the picture information, it is customary practice to derive the automatic gain control potential from the synchronizing-signal components which correspond to the peak amplitude of the composite television signal, so that the automatic gain control potential is more truly indicative of the strength of the signal. In many receivers, a keying or gating signal is applied to the automatic gain control generator to render it operative only during synchronizing-pulse intervals; for this reason, such a system is referred to as a gated automatic gain control system.

Thus, conventional receivers employ two separate electron-discharge devices for performing the functions of synchronizing-signal separation and automatic gain control generation. With such an arrangement, the bias for the synchronizing-signal separator is necessarily derived separately from the automatic gain control potential; consequently, such variations in composite video signal level as may be caused by incorrect setting or drift of the automatic gain control adjustment may result in incorrect operation of the synchronizing-signal separator. Moreover most synchronizing-signal separators are quite sensitive to extraneous impulse noise which may be attributable to ignition noise or the like and which may lead to intermittent loss of synchronization. The automatic gain control system may be insensitive to noise impulses occurring during video-signal intervals, due to the use of a gating signal, but such noise impulses as may be superimposed on the synchronizing-signal components of the composite video signals contribute to the automatic gain control potential.

It is an important object of the present invention to provide a new and improved combination synchronizing-signal separator and automatic gain control generator for a television receiver.

It is a further object of the invention to provide such a system having greatly improved noise immunity.

Yet another object of the invention is to provide a combined synchronizing-signal separator and automatic gain control generator in which the proper clipping level for the synchronizing-signal separator is automatically established for all receiver-input signal levels, so that incorrect synchronizing-signal clipping, heretofore encountered as a result of drift or misadjustment of the automatic gain control circuits, is effectively precluded.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection. The polarity of a composite video signal is determined by referring the synchronizing-pulse components to the video-signal components; thus, a "positive-polarity" composite video signal is one in which the synchronizing-signal pulses are positively oriented with respect to the video-signal components, while a "negative-polarity" composite video signal is one in which the synchronizing-pulse components are negatively oriented with respect to the picture information.

Figure 1:
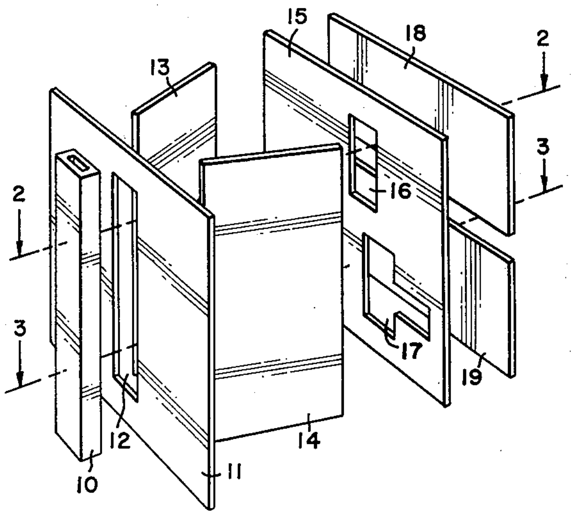
Figure 1 is a perspective view of the electrode system of a new and improved beam deflection tube which is useful in a synchronizing system constructed in accordance with the present invention.
Figure 2:
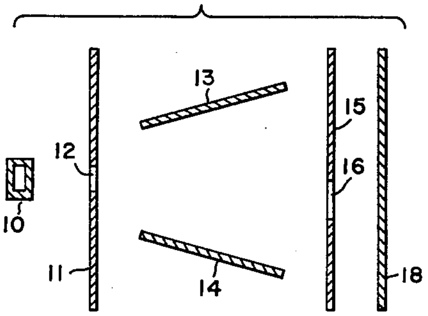
Figure 2 is a cross-sectional view taken along the line 2—2 of Figure 1.
Figure 3:
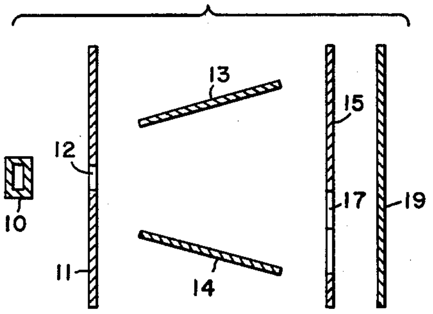
Figure 3 is a cross-sectional view taken along the line 3—3 of Figure 1.

In the perspective view of Figure 1 and the cross-sectional views of Figures 2 and 3, which illustrate the essential elements of the electrode system of a beam deflection tube which is useful in the system of the present invention, there is shown an electron gun comprising an elongated electron-emissive cathode 10 (having an associated heater element, not shown) and an accelerating electrode 11 provided with a slot 12 opposite the emissive surface of cathode 10. The electron gun comprising accelerator 11 and elongated cathode 10 projects a sheet-like electron beam of substantially rectangular cross-section between a pair of deflection plates 13 and 14 toward a target electrode or intercepting anode 15 which is provided with two apertures 16 and 17 disposed in predetermined space relation with respect to each other in a manner to be hereinafter described. A pair of plate electrodes 18 and 19 are provided for collecting space electrons which pass through respective apertures 16 and 17 in intercepting anode 15. Preferably, the tube is so constructed and operated that the width of the beam at the plane of target electrode 15 is less than that of aperture 16.

In operation, the transverse deflection field established by deflection plates 13 and 14 is adjusted in its biased or steady-state condition to direct the electron beam to an electron-impervious portion of intercepting anode 15. When an input signal is impressed on deflection plate 14, the beam is deflected at least partially into apertures 16 and 17 whenever the input signal reaches a predetermined amplitude level. During such intervals, current flows in the output circuits associated with plate electrodes 18 and 19, while during other intervals no such current flow occurs. Moreover, when the input signal exceeds a predetermined higher amplitude, the beam is deflected beyond aperture 16 of intercepting anode 15, and current flow to plate electrode 18 is again interrupted. At still greater amplitudes, the current flowing to plate electrode 19 is first reduced and then extinguished as the beam sweeps from the wide portion to the narrow portion of aperture 17 and beyond. Consequently, the transfer characteristics of the deflection control system with respect to plate electrodes 18 and 19 are substantially as represented by curves 20 and 21 respectively of Figure 4, in which the plate currents $i_{p1}$ and $i_{p2}$, respectively, are plotted as functions of the input voltage $e_1$ applied to the deflection-control system 13, 14. It is evident from Figure 4 that curve 20 comprises a high positive-transconductance region, a region of zero transconductance and a region of negative transconductance in the recited order as $e_1$ is progressively increased; curve 21 comprises in similar order, a region of high positive transconductance, a first zero-transconductance region, a negative-transconductance region, another zero-transconductance region, representing less plate current than the first zero-transconductance region, and another negative-transconductance region. Because of the staggered or overlapping alignment of slots 16 and 17, the high-transconductance region of transfer characteristic 21 falls within the zero-transconductance control-electrode voltage range of characteristic 20.

In Figures 1–3, only the essential elements of the electrode system are illustrated. Refinements of this system may be added in accordance with well-known practices in the art. Thus, for example, a plate electrode having a slot narrower than the emissive surface of cathode 10 may be interposed between cathode 10 and accelerating electrode 11 and maintained at or near cathode potential to restrict electron emission to a narrow central portion of the emissive surface of cathode 10. Moreover, it may be advantageous to include one or more suppressor electrodes between intercepting anode 15 and plate electrodes 18 and 19. The particular form of deflection-control means employed is not essential to the present invention; one or both of the deflection plates 13 and 14 may be replaced by several electrodes biased at different potentials which may correspond for example to cathode potential and the D. C. supply voltage of the associated apparatus with which the tube is employed, or a magnetic-deflection system may be employed. Moreover, entirely equivalent operation may be obtained by employing separate electron beams subjected to a common transverse deflection field or synchronous deflection fields.

The electrode system is mounted within a suitable envelope (not shown) which may then be evacuated, gettered and based in accordance with well-known procedures in the art. The entire structure may conveniently be included within a miniature tube envelope.

A beam deflection tube of the type shown and described in connection with Figures 1–4 may be employed in a television receiver as a combined synchronizing-signal separator and automatic gain control generator as in the receiver schematically illustrated in Figure 5. Incoming composite television signals are intercepted by an antenna 25 and translated by receiving circuits, including a radio-frequency amplifier 26, an oscillator-converter 27 and an intermediate-frequency amplifier 28, to a video detector 29. Detected composite video signals from video detector 29 are impressed on the input circuit of a cathode-ray tube 30 or other suitable image-reproducing device through first and second video amplifiers 31 and 32. Intercarrier sound signals from first video amplifier 31 are detected and amplified by conventional sound circuits 33 and impressed on a loudspeaker 34 or other suitable sound-reproducing device.

Composite video signals from first video amplifier 31 are also impressed on a combined synchronizing-signal separator and automatic gain control generator generally designated by the reference numeral 35. Synchronizing-signal components of the composite video signals are translated to a suitable scanning system 36 which provides suitable sweep signals to line-frequency and field-frequency deflection coils 37 and 38 associated with image-reproducing device 30. A keying signal from scanning system 36 is also applied to the automatic gain control section of stage 35, which develops a unidirectional control potential for application to one or more of the receiving circuits 26, 27 and 28 to effect automatic gain control of the receiver.

More specifically, positive-polarity composite video signals from first video amplifier 31 are impressed across a resistive voltage divider comprising resistors 40 and 41, the junction between these resistors being connected to one deflection plate 14 of a beam deflection tube 42 of the type shown and described in connection with Figures 1–4. Cathode 10 of device 42 is connected to ground, and accelerating electrode 11 is connected to intercepting anode 15, both of these electrodes being connected to a suitable source of unidirectional operating potential, conventionally designated B+. Deflection plate 13 is connected to a tap on a voltage divider comprising resistors 44 and 45 connected between B+ and ground and is by-passed to ground by means of a condenser 46. Plate electrode 18 is connected to B+ through a load resistor 47 and is also coupled to scanning system 36. A suitable keying signal, bearing a fixed phase relation to the scansion of image-reproducing device 30, is applied by means of a coupling condenser 48 and a shunt resistor 49 to plate electrode 19, which is also connected to the automatic gain control lead 50 through an integrating network comprising a series resistor 51 and a shunt condenser 52.

In operation, positive-polarity composite video signals including the direct voltage component from the output circuit of first video amplifier 31 are applied to deflection plate 14 by means of a voltage divider comprising the series combination of resistors 40 and 41. It is unnecessary to provide a voltage-divider action for the alternating-current components of the composite video signals; consequently, resistor 40 may be by-passed for signal frequencies by means of a condenser 53 if desired. Deflection plates 13 and 14 are so biased that the beam projected through aperture 12 of accelerating electrode 11 is normally directed to an electron-impervious portion of intercepting anode 15, for instance, to a solid portion of anode 15 on the side of apertures 16 and 17 nearer deflection plate 13. Application of the positive-polarity composite video signals to deflection plate 14 causes a transverse deflection of the beam in accordance with the instantaneous signal amplitude. The operating potentials for the various electrodes are so adjusted that different longitudinal portions of the beam are respectively deflected entirely into aperture 16 and partially into aperture 17 of intercepting anode 15 in response to the synchronizing-signal components of the applied composite video signals; the beam is entirely intercepted by anode 15 during video-signal intervals. As a consequence, only the synchronizing-signal components are translated to scanning system 36 by way of plate electrode 18 and load resistor 47. Moreover, space current flow to plate electrode 19 is restricted to synchronizing-pulse intervals.

A suitable keying signal, which may comprise positive-polarity line-frequency retrace pulses or other suitably phased signals bearing a fixed phase relation to the line-frequency and/or field-frequency scansion of image-reproducing device 30, is applied from scanning system 36 to plate electrode 19 by means of condenser 48 and resistor 49. This keying signal performs a gating function, permitting plate electrode 19 to accept space current passing through aperture 17 of intercepting anode 15 only during those intervals when plate electrode 19 is instantaneously positive. Consequently, a control potential is developed in response to time coincidence of the synchronizing-signal components of the composite video signals and a positive-polarity keying signal applied to plate electrode 19. This control potential is of negative polarity and is integrated by means of resistor 51 and condenser 52 to provide a negative-polarity unidirectional control potential for application to the AGC lead 50. It is apparent, then, that both synchronizing signal separation and automatic gain control generation are accomplished by means of a single beam deflection tube 42.

Certain important advantages of the system described in connection with Figure 5 may best be understood by consideration of that figure in connection with Figures 1 and 4. Since aperture 16 in intercepting anode 15 has definite fixed boundaries, it is apparent that deflection of the beam beyond aperture 16 results in interception thereof by anode 15. Consequently, extraneous noise pulses, which are generally of much larger amplitude than any desired component of the composite video signals, are not translated to plate electrode 18. Thus, loss of synchronization due to extraneous impulse noise is substantially precluded. This operation is apparent from the operating characteristic 20 of Figure 4. When composite video signals comprising synchronizing-pulse components 60 and video-signal components 61 are impressed on deflection plate 14, extraneous noise pulses 62 and 63 which are of greater amplitude than the synchronizing-pulse components by an amount exceeding the voltage represented by the spacing between vertical lines 64 and 65, and thus greater than the input signal amplitudes within the negative transconductance region of curve 20, result in deflection of the beam beyond aperture 16; consequently, these noise pulses are not translated to the output circuits associated with plate electrode 18, and substantial noise immunity is achieved. Aperture 16 is preferably of constant length in a direction parallel to cathode 10, in order to provide output pulses of constant amplitude for application to scanning system 36.

Figure 4:
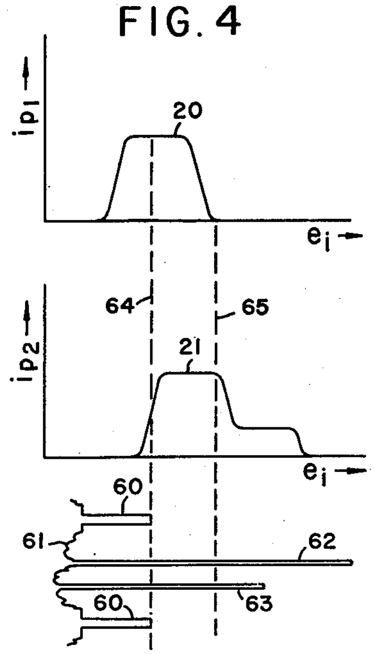
Figure 4 is a graphical representation of certain of the operating characteristics of the tube shown in Figures 1–3.
Figure 5:
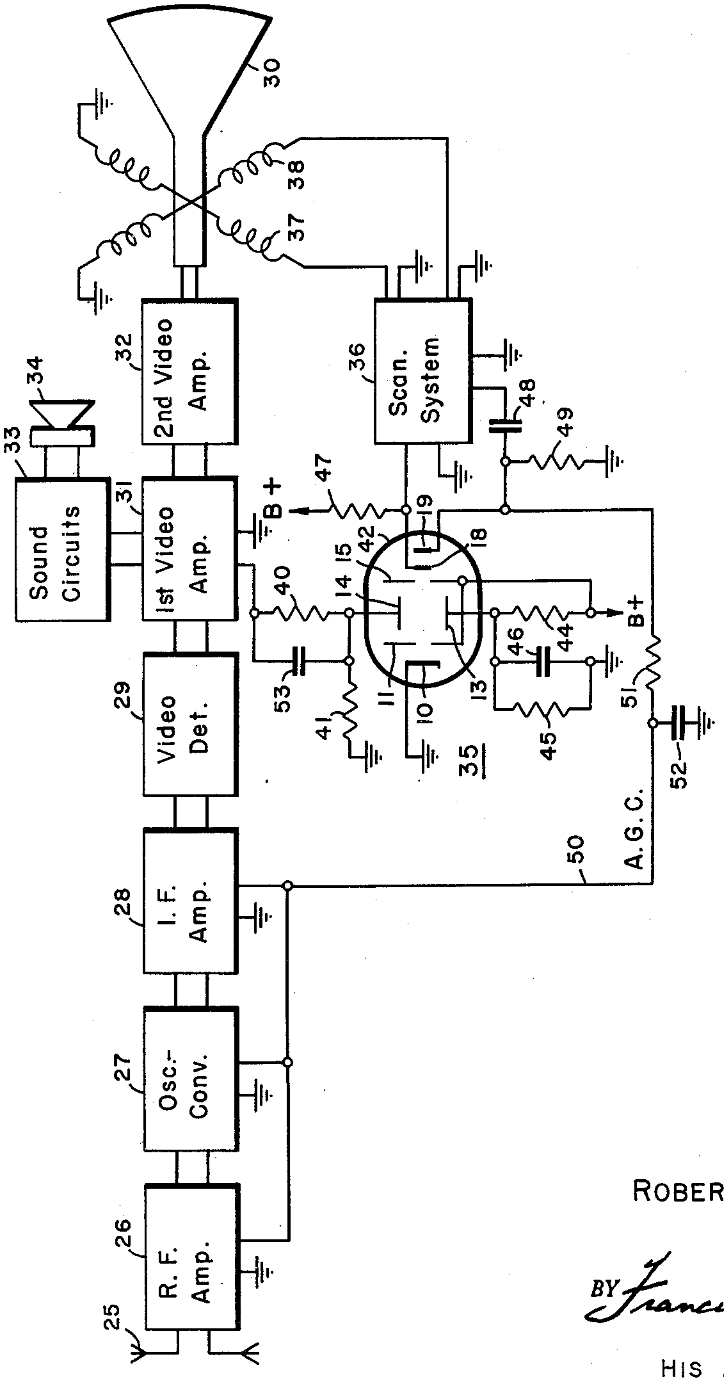
Figure 5 is a schematic diagram of a television receiver embodying the present invention.

The operation of the gated automatic gain control system may perhaps best be understood by a consideration of operating characteristic 21 of Figure 4. Space electrons are permitted to pass to plate electrode 19 only when the electron beam is laterally deflected at least partially into aperture 17, and then only if plate electrode 19 is instantaneously maintained at a positive potential by the keying signal applied thereto from scanning system 36. In an equilibrium condition, the deflection-control system is so biased that the peaks of the synchronizing-signal pulses are impressed on the rising portion of characteristic 21, as indicated by vertical line 64. When the signal amplitude increases, the peaks of the synchronizing pulses 60 extend farther to the right, and the space current to plate electrode 19 is increased. This results in an increase in the negative unidirectional control potential applied to the receiving circuits 26, 27 and 28, thus reducing the gain of these circuits and thereby restoring the amplitude of the input signal applied to deflection plate 14 to the equilibrium value indicated in the drawing. On the other hand, if the signal amplitude instantaneously decreases, the negative gain control potential decreases and the gain of the receiving circuits is increased to restore equilibrium. Noise pulses 62 and 63 occurring during the video signal intervals have no effect on the automatic gain control potential since plate electrode 19 is maintained at or below cathode potential during these intervals by the keying signal applied from scanning system 36. Moreover, even such noise pulses as may occur during synchronizing pulse intervals, if of sufficiently great amplitude, are prevented from contributing to the automatic gain control potential by virtue of the finite boundaries of aperture 17. Consequently, even greater noise immunity is obtained with the gated automatic gain control system of the present invention than with conventional gated automatic gain control arrangements employing grid-controlled tubes for AGC generation.

Since it is desirable for the synchronizing pulses translated by way of plate electrode 18 and load resistor 47 to scanning circuits 36 to be of constant amplitude, it is preferred that the peaks of the synchronizing-pulse components 60 be impressed on characteristic 20 at a constant-current or zero-transconductance region of that characteristic; in other words, the amplitude of the synchronizing-pulse components of the applied composite video signals should be within that range of amplitudes that cause deflection of the upper portion of the beam entirely into aperture 16. At the same time, because of the automatic gain control action, the peaks of the synchronizing-pulse components 60 are always superimposed on a sloping or high-transductance portion of characteristic 21; in other words, the synchronizing-pulse components of the applied composite video signals cause deflection of the lower portion of the beam only partially into aperture 17. By disposing apertures 16 and 17 in overlapping or staggered alignment in a direction parallel to cathode 10, as illustrated in Figures 1–3, it is insured that whenever the automatic gain control action establishes the equilibrium condition represented by the graphical representation of Figure 4, synchronizing pulses of constant amplitude are developed at plate electrode 18 for application to the scanning system since the synchronizing-pulse components are maintained at an amplitude superimposed on the zero-transconductance region of characteristic 20 by virtue of the maintenance of the synchronizing-pulse components on the high-transconductance region of characteristic 21, and the clipping level of the synchronizing-signal separator is automatically adjusted to accommodate varying signal strengths at the receiver input.

When the receiver is first turned on, or during channel switching operations, the receiver circuits are condition for operation at full gain. If the signal to which the receiver is tuned under these conditions is a strong one, the automatic gain control system might become paralyzed unless special precautions were taken to provide for the establishment of a suitable negative automatic gain control potential in the first instance. Consequently, it is preferred to make aperture 17 of considerably larger transverse extent than aperture 16. Such a construction however, detracts at least partially from the immunity of the automatic gain control system to extraneous noise impulses occurring during synchronizing-pulse intervals. Consequently, it is preferred to make aperture 17 of varying length in a direction parallel to the cathode 10, in order to avoid paralysis of the receiver when the set is initially turned on or during channel switching operations, while at the same time providing at least partial noise immunity during synchronizing-pulse intervals. In the specific arrangement shown and described in connection with Figures 1–3, a T-shaped aperture 17 is employed. Such a construction permits the flow of at least some space current to plate electrode 19 under strong signal conditions when the receiver is first turned on, so that a negative automatic gain control potential is produced to reduce the gain of the receiving circuits and establish the equilibrium condition represented by Figure 4. Even if aperture 17 is of constant length in a direction parallel to the cathode, however, the noise immunity of the gated automatic gain control system is fully equivalent to that obtained with conventional systems now employed in commercially produced receivers.

At the cost of a minor reduction in noise immunity, the time gating of the automatic gain control circuit may be omitted, and a constant energizing potential may be applied to plate electrode 19 in lieu of the gating signal from the scanning system. When the system is modified in this manner, plate electrode 19 is conditioned to accept all space electrons passing through aperture 17. Certain operating advantages may be achieved in this manner, and a system of this type is specifically described and claimed in the copending application of John G. Spracklen, Serial No. 281,708, filed April 11, 1952, for Television Receiver, and assigned to the present assignee.

While the desired operating characteristics are obtained in the beam deflection tube of Figures 1–3 by employing an apertured target or intercepting anode backed by a pair of plate electrodes, it is apparent that equivalent operation may be achieved by providing plate electrodes of a size, shape and space distribution corresponding to apertures 16 and 17, followed by anode means for collecting space electrons not collected by such plate electrodes. In some of the appended claims, therefore, the output system is described as comprising one or more plate electrodes having specifically defined receptive areas, and this terminology is to be construed as descriptive of a tube employing either the apertured target construction of Figures 1–3 or the alternative construction described above. However, the apertured target construction is preferred for its simplicity and ease of manufacture.

Thus, the present invention provides a new and improved combination synchronizing-signal separator and gated automatic gain control generator for use in a television receiver or the like. The system embodies a simple beam deflection tube the electrode system of which may be constructed entirely of punched sheet metal parts. The system requires an extremely small number of associated circuit components and provides noise immunity equivalent to or better than that heretofore obtained in conventional receivers employing separate stages for synchronizing-signal separation and automatic gain control generation. Moreover, by virtue of the staggered arrangement of the receptive areas of the plate electrodes of the beam deflection tube, the correct clipping level is automatically established for the synchronizing-signal separator for all receiver-input signal levels, and this advantageous characteristic is accomplished without requiring the use of any additional circuit elements; incorrect synchronizing-signal separation due to drift or misadjustment of the automatic gain control circuits, as observed in conventional receivers, is rendered impossible.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. In a television receiver for utilizing transmitted composite television signals: an image-reproducing device; a scanning system for controlling the scansion of said image-reproducing device; receiving circuits for translating said composite television signals; a video detector for demodulating said translated composite television signals to produce unidirectional composite video signals including video-signal components and synchronizing-signal components of amplitude greater than the maximum amplitude of said video-signal components; means coupled to said video detector and to said scanning system for utilizing said synchronizing-signal components to control said scanning system; an electron-discharge device having a cathode and a plate electrode, and a control electrode intermediate said cathode and said plate electrode responsive to an applied voltage exceeding a predetermined minimum for directing space current to said plate electrode; D. C. coupling means for impressing said composite video signals on said control electrode to direct space current to said plate electrode in response to said synchronizing-signal components; means for preventing the flow of space current to said plate electrode when said composite video signals instantaneously exceed a predetermined amplitude greater than the peak amplitude of said synchronizing-signal components; means for conditioning said plate electrode to accept at least a portion of the space current directed thereto; means including an integrating circuit coupled to said plate electrode for developing a unidirectional control potential; and means for utilizing said control potential to control an operating characteristic of said receiver.

2. In a television receiver for utilizing transmitted composite television signals: an image-reproducing device; a scanning system for controlling the scansion of said image-reproducing device; receiving circuits for translating said composite television signals; a video detector for demodulating said translated composite television signals to produce unidirectional composite video signals including video-signal components and synchronizing-signal components of amplitude greater than the maximum amplitude of said video-signal components; means coupled to said video detector and to said scanning system for utilizing said synchronizing-signal components to control said scanning system; a beam deflection tube comprising an electron gun for projecting an electron beam, a plate electrode having a predetermined receptive area, deflection-control means responsive to an input signal for subjecting said beam to a transverse deflection field, and an anode for collecting space electrons not collected by said plate electrode; D. C. coupling means for impressing said composite video signals on said deflection-control means to cause transverse deflection of said electron beam partially onto said receptive area in response to said synchronizing-signal components; means for conditioning said plate electrode to accept at least a portion of the space current directed thereto; means including an integrating circuit coupled to said plate electrode for developing a unidirectional control potential indicative of the amplitude of said composite video signals; and means for applying said control potential to said receiving circuits to effect automatic gain control of said receiver.

3. In a television receiver for utilizing transmitted composite television signals: an image-reproducing device; a scanning system for controlling the scansion of said image-reproducing device; receiving circuits for translating said composite television signals; a video detector for demodulating said translated composite television signals to produce unidirectional composite video signals including video-signal components and synchronizing-signal components of amplitude greater than the maximum amplitude of said video-signal components; means coupled to said video detector and to said scanning system for utilizing said synchronizing-signal components to control said scanning system; a beam deflection tube comprising an electron gun including an elongated cathode for projecting a sheet-like electron beam of substantially rectangular cross-section, a plate electrode having a predetermined receptive area of varying length in a direction parallel to said cathode, deflection-control means responsive to an input signal for subjecting said beam to a transverse deflection field, and an anode for collecting space electrons not collected by said plate electrode; D. C. coupling means for impressing said composite video signals on said deflection-control means to cause transverse deflection of said electron beam partially onto said receptive area in response to said synchronizing-signal components; means for conditioning said plate electrode to accept at least a portion of the space current directed thereto; means including an integrating circuit coupled to said plate electrode for developing a unidirectional control potential indicative of the amplitude of said composite video signals; and means for applying said control potential to said receiving circuits to effect automatic gain control of said receiver.

4. In a television receiver for utilizing transmitted composite television signals: an image-reproducing device; a scanning system for controlling the scansion of said image-reproducing device; receiving circuits for translating said composite television signals; a video detector for demodulating said translated composite television signals to produce unidirectional composite video signals including video-signal components and synchronizing-signal components of amplitude greater than the maximum amplitude of said video-signal components; means coupled to said video detector and to said scanning system for utilizing said synchronizing-signal components to control said scanning system; a beam deflection tube comprising an electron gun including an elongated cathode for projecting a sheet-like electron beam of substantially rectangular cross-section, a plate electrode having a predetermined receptive area bounded by two opposite sides of different length in a direction parallel to said cathode, deflection-control means responsive to an input signal for subjecting said beam to a transverse deflection field, and an anode for collecting space electrons not collected by said plate electrode; D. C. coupling means for impressing said composite video signals on said deflection-control means to cause transverse deflection of said electron beam partially across the longer of said opposite sides onto said receptive area in response to said synchronizing-signal components; means for conditioning said plate electrode to accept at least a portion of the space current directed thereto; means including an integrating circuit coupled to said plate electrode for developing a unidirectional control potential indicative of the amplitude of said composite video signals; and means for applying said control potential to said receiving circuits to effect automatic gain control of said receiver.

5. In a television receiver for utilizing transmitted composite television signals: an image-reproducing device; a scanning system for controlling the scansion of said image-reproducing device; receiving circuits for translating said composite television signals; a video detector for demodulating said translated composite television signals to produce unidirectional composite video signals including video-signal components and synchronizing-signal components of amplitude greater than the maximum amplitude of said video-signal components; means coupled to said video detector and to said scanning system for utilizing said synchronizing-signal components to control said scanning system; a beam deflection tube comprising an electron gun including an elongated cathode for projecting a sheet-like electron beam of substantially rectangular cross-section, an anode having an aperture of varying length in a direction parallel to said cathode, deflection-control means for normally directing said beam to an electron-impervious portion of said anode and responsive to an input signal for subjecting said beam to a transverse deflection field, and a plate electrode for collecting space electrons passing through said aperture; D. C. coupling means for impressing said composite video signals on said deflection-control means to cause transverse deflection of said electron beam partially into said aperture in response to said synchronizing-signal components; means for conditioning said plate electrode to accept at least a portion of the space current directed thereto; means including an integrating circuit coupled to said plate electrode for developing a unidirectional control potential indicative of the amplitude of said composite video signals; and means for applying said control potential to said receiving circuits to effect automatic gain control of said receiver.

6. In a television receiver for utilizing transmitted composite television signals: an image-reproducing device; a scanning system for controlling the scansion of said image-reproducing device; receiving circuits for translating said composite television signals; a video detector for demodulating said translated composite television signals to provide unidirectional composite video signals including video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a pair of plate electrodes having respective receptive areas in overlapping alignment in a direction parallel to said cathode, deflection-control means responsive to an input signal for subjecting said beam to a transverse deflection field, and anode means for collecting space electrons not collected by said plate electrodes; D. C. coupling means for impressing said composite video signals on said deflection-control means to cause transverse deflection of one longitudinal portion of said beam entirely onto one of said plate electrodes and another longitudinal portion of said beam partially onto the other of said plate electrodes in response to said synchronizing-signal components; an output circuit coupled to said one plate electrode and to said scanning system for translating only said synchronizing-signal components to said scanning system; means for conditioning said other plate electrode to accept at least a portion of the space current directed thereto; means including an integrating circuit coupled to said other plate electrode for developing a unidirectional control potential indicative of the amplitude of said composite video signals; and means for applying said control potential to said receiving circuits to effect automatic gain control of said receiver.

7. In a television receiver for utilizing transmitted composite television signals: an image-reproducing device; a scanning system for controlling the scansion of said image-reproducing device; receiving circuits for translating said composite television signals; a video detector for demodulating said translated composite television signals to provide unidirectional composite video signals including video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, an anode having a first aperture of substantially constant length in a direction parallel to said cathode and a second aperture of varying length in a direction parallel to said cathode, said apertures being in overlapping alignment in a direction parallel to said cathode, deflection-control means for normally directing said beam to an electron-impervious portion of said anode and responsive to an input signal for subjecting said beam to a transverse deflection field, and plate electrodes for collecting space electrons passing through said respective apertures; D. C. coupling means for impressing said composite video signals on said deflection-control means to cause transverse deflection of one longitudinal portion of said beam entirely into one of said apertures and another longitudinal portion of said beam partially into the other of said apertures in response to said synchronizing-signal components; an output circuit coupled to a plate electrode associated with said one aperture and to said scanning system for translating only said synchronizing-signal components to said scanning system; means for conditioning another plate electrode, associated with said other aperture, to accept at least a portion of the space current directed thereto; means including an integrating circuit coupled to said other plate electrode for developing a unidirectional control potential indicative of the amplitude of said composite video signals; and means for applying said control potential to said receiving circuits to effect automatic gain control of said receiver.

8. In a television receiver for utilizing transmitted composite television signals: an image-reproducing device; a scanning system for controlling the scansion of said image-reproducing device; receiving circuits for translating said composite television signals; a video detector for demodulating said translated composite television signals to provide unidirectional composite video signals including video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, an anode having two apertures in overlapping alignment in a direction parallel to said cathode, electrostatic deflection-control means for normally directing said beam to an electron-impervious portion of said anode and responsive to an input signal for subjecting said beam to a transverse deflection field, and plate electrodes for collecting space electrons passing through said respective apertures; D. C. coupling means for impressing said composite video signals on said deflection-control means to cause transverse deflection of one longitudinal portion of said beam entirely into one of said apertures and another longitudinal portion of said beam partially into the other of said apertures in response to said synchronizing-signal components; an output circuit coupled to a plate electrode associated with said one aperture and to said scanning system for translating only said synchronizing-signal components to said scanning system; means for conditioning another plate electrode, associated with said other aperture, to accept at least a portion or the space current directed thereto; means including an integrating circuit coupled to said other plate electrode for developing a unidirectional control potential indicative of the amplitude of said composite video signals; and means for applying said control potential to said receiving circuits to effect automatic gain control of said receiver.

References Cited in the file of this patent

UNITED STATES PATENTS

| | | |
|---|---|---|
| 2,211,860 | Plaistowe | Aug. 20, 1940 |
| 2,227,056 | Blumlein et al. | Dec. 31, 1940 |
| 2,251,929 | Freeman et al. | Aug. 12, 1941 |

OTHER REFERENCES

Publication Rider Television Manual, vol. 4, Zenith TV, pages 4–43, chassis 23G24, copyright November 1949.